(12) United States Patent
Wall et al.

(10) Patent No.: US 6,591,056 B1
(45) Date of Patent: Jul. 8, 2003

(54) CONNECTOR TERMINUS SPRINGS

(75) Inventors: Stephen Wesley Wall, Costa Mesa, CA (US); James Thomas Hartley, Tustin, CA (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/538,681

(22) Filed: Mar. 30, 2000

(51) Int. Cl.[7] .................... G02B 6/00; G02B 6/36
(52) U.S. Cl. .................... 385/147; 385/60; 385/72; 385/78
(58) Field of Search ............. 385/53–56, 60–68, 385/72, 78–84, 95, 134, 136, 137, 139, 147

(56) References Cited

U.S. PATENT DOCUMENTS

| | | | |
|---|---|---|---|
| 3,769,158 A | * 10/1973 | Winders | 376/440 |
| 3,904,269 A | 9/1975 | Lebduska et al. | 385/54 |
| 3,963,323 A | 6/1976 | Arnold | 385/62 |
| 4,268,115 A | 5/1981 | Slemon et al. | 385/88 |
| 4,274,708 A | * 6/1981 | Cocito et al. | 385/95 |
| 4,279,467 A | 7/1981 | Borsuk et al. | 385/65 |
| 4,684,205 A | 8/1987 | Margolin et al. | 385/68 |
| 4,696,540 A | * 9/1987 | Adams et al. | 385/66 |
| 4,735,480 A | 4/1988 | Levinson et al. | 385/58 |
| 4,752,111 A | 6/1988 | Fisher | 385/55 |
| 4,762,389 A | 8/1988 | Kaihara | 385/60 |
| 4,772,081 A | 9/1988 | Borgos et al. | 385/89 |
| 4,787,701 A | 11/1988 | Stenger et al. | 385/70 |
| 4,789,218 A | 12/1988 | Paul et al. | 385/58 |
| 4,798,440 A | 1/1989 | Hoffer et al. | 385/89 |
| 4,804,243 A | 2/1989 | Borsuk et al. | 385/76 |
| 4,807,957 A | 2/1989 | de Jong et al. | 385/64 |
| 4,913,513 A | 4/1990 | Kuromatsu et al. | 385/60 |
| 4,944,568 A | 7/1990 | Danbach et al. | 385/88 |
| 4,969,924 A | 11/1990 | Suverison et al. | 385/78 |
| 5,011,258 A | 4/1991 | Takeda | 385/56 |
| 5,048,916 A | 9/1991 | Caron | 385/71 |
| 5,166,997 A | 11/1992 | Norland et al. | 385/87 |
| 5,222,169 A | 6/1993 | Chang et al. | 385/87 |
| 5,224,187 A | * 6/1993 | Davisdon | 385/87 |
| 5,261,019 A | 11/1993 | Beard et al. | 385/60 |
| 5,293,582 A | 3/1994 | Beard et al. | 385/78 |
| 5,373,574 A | 12/1994 | Marazzi | 385/78 |
| 5,481,634 A | 1/1996 | Anderson et al. | 385/76 |
| 5,533,157 A | 7/1996 | Coutts | 385/53 |
| 5,550,944 A | * 8/1996 | van Woesik et al. | 385/73 |
| 5,577,144 A | 11/1996 | Rossana et al. | 385/78 |
| 5,590,229 A | 12/1996 | Goldman et al. | 385/59 |
| 5,608,828 A | 3/1997 | Coutts et al. | 385/59 |
| 5,668,904 A | * 9/1997 | Sutherland et al. | 385/72 |
| 5,717,802 A | 2/1998 | Briggs et al. | 385/75 |
| 5,757,997 A | 5/1998 | Birrell et al. | 385/60 |
| 5,761,360 A | 6/1998 | Grois et al. | 385/81 |
| 5,768,455 A | 6/1998 | Konik | 385/86 |
| 5,828,806 A | 10/1998 | Grois et al. | 385/78 |
| 6,113,082 A | * 9/2000 | Fujino | 267/103 |
| 6,126,423 A | * 10/2000 | Freeland | 418/57 |

FOREIGN PATENT DOCUMENTS

| | | |
|---|---|---|
| GB | 1454600 | 11/1976 |
| JP | 53-26145 | 10/1978 |

* cited by examiner

*Primary Examiner*—John D. Lee
(74) *Attorney, Agent, or Firm*—Thomas N. Twomey

(57) ABSTRACT

Unitary construction springs are provided for exerting an axial spring force for biasing a terminus of a connector outwardly so as to assure that the terminus abuts a corresponding terminus in a mating connector with sufficient force for maintaining proper contact when exposed to shocks and vibrations.

17 Claims, 5 Drawing Sheets

CONNECTOR TERMINUS SPRINGS

BACKGROUND OF THE INVENTION

Connectors for attaching optical fibers to one another comprise a housing within which at least one connector terminus is located. Each connector terminus holds an optical fiber such that the optical fiber is in desired alignment with respect to a corresponding optical fiber in a connector terminus in the mating connector. One of the connector termini applies a spring pressure which causes the terminus to extend outwardly from the connector. The spring pressure provides a force which assures that the two mating termini abut one another with sufficient force to maintain desired alignment and contact of the optical fibers during shock and vibration and with sufficient force to mitigate Fresnel losses due to the formation of undesirable air gaps therebetween.

It is therefore desirable that each terminus extend from a connector under a spring biasing force. However, it has been found that coil springs, which wrap around a terminus in a helical configuration, are not suitable. Coil springs are not capable of providing sufficient force, e.g., approximately five pounds, which is required for proper mating of the termini. A stack of Belleville washers, centered about the terminus, are typically used to form a Belleville spring to provide the desired spring biasing force. Each Belleville washer has a surface which tapers outwardly in a radially inward direction. The stack of Belleville washers generally contains approximately eleven washers oriented such that adjacent washers face in opposite directions, so as to provide the desired spring force. Thus, when a terminus is pushed inwardly, i.e., toward the connector, the Belleville washers tend to flatten so as to provide the desired outwardly directed spring biasing force.

Because of the small size of each terminus, Belleville washers having a diameter of approximately $1/10$ of an inch are necessary. As can be appreciated the handling of such small washers during assembly of the terminus is extremely difficult and time consuming. The individual Belleville washers must be painstakingly stacked about the terminus, one atop another, to form a spring. Not only is it difficult to pick up and handle such small washers one at a time, as is necessary during the stacking process, but it is also difficult to ascertain the orientation of each washer (to determine which side of the washer has the tapering surface). Further, it is necessary that such assembly be done using a microscope.

As such, it is desirable to provide a spring biasing mechanism which is not subject to the handling and assembly difficulties associated with the formation of a stack of Belleville washers.

SUMMARY OF THE INVENTION

Unitary construction springs are provided for spring biasing each fiber optic terminus of a connector outwardly, so as to assure that it abuts a corresponding terminus of a mating connector with sufficient force for maintaining proper contact when exposed to shocks and vibrations. A first embodiment spring has an annular construction defining an annular inwardly extending channel having two legs and a convex web therebetween. The two legs extend radially inward from the web. Each leg defines an annular flange. Externally, the convex web defines an annular concavity. When axially compressed, the annular flanges are flexed inward and provide an axial force as they try to extend outward to regain their original position. The convex web also allows for some axial compression of the spring and thereby also generates a spring force.

Optionally, the spring may be configured to have a split-ring construction such that it is insertable over the terminus probe without having to be slid over the end thereof. In other words, the spring may comprise a discontinuity or split formed along its length allowing the spring to be opened up so as to allow it to receive the terminus probe through the split thereof.

An optional retaining ring may be utilized to maintain the spring in position about the terminus and to prevent the accidental disengagement of the spring from the terminus. The ring is fitted in surrounding relationship to the annular spring and is preferably fitted within the concavity defined on the outer surface of the web. The retaining ring should preferably be a split ring such that it may be easily fitted over the annular spring.

An alternative embodiment of the unitary construction spring of the present invention is also of annular construction and comprises a cylindrical body having an edge beveled radially inward and a longitudinal split spanning the length of the spring. In operation the spring is pushed against a stop member on the terminus causing the spring beveled edge to ride against the stop member and the spring to radially expand about the split. The spring generates a spring force as the spring attempts to regain its original position and the beveled edge cams the spring against the stop member.

Another embodiment spring of the present invention comprises a generally cylindrical body having a plurality of pairs of cut-outs which define a plurality of deformable beams which deform so as to provide a spring action. This embodiment spring is formed by taking a hollow cylinder and cutting a series of first and second diametrically opposed pairs of cut-outs through the cylinder body. The first pairs of cut-outs are oriented at 90° with respect to the second pairs of cut-outs, thus defining the plurality of beams which bend when compressive force is applied to the spring. Each pair of cut-outs are preferably parallel to a plane perpendicular to the longitudinal axis of the cylinder. Moreover, to provide sufficient flexibility to the "beams" each cutout of each pair spans a major portion of half of the cylinder periphery.

DESCRIPTION OF THE PREFERRED EMBODIMENT

The present invention provides for a unitary construction spring for spring biasing each terminus of a connector outwardly, so as to assure that it abuts a corresponding terminus of a mating connector with sufficient force.

Figure 1:
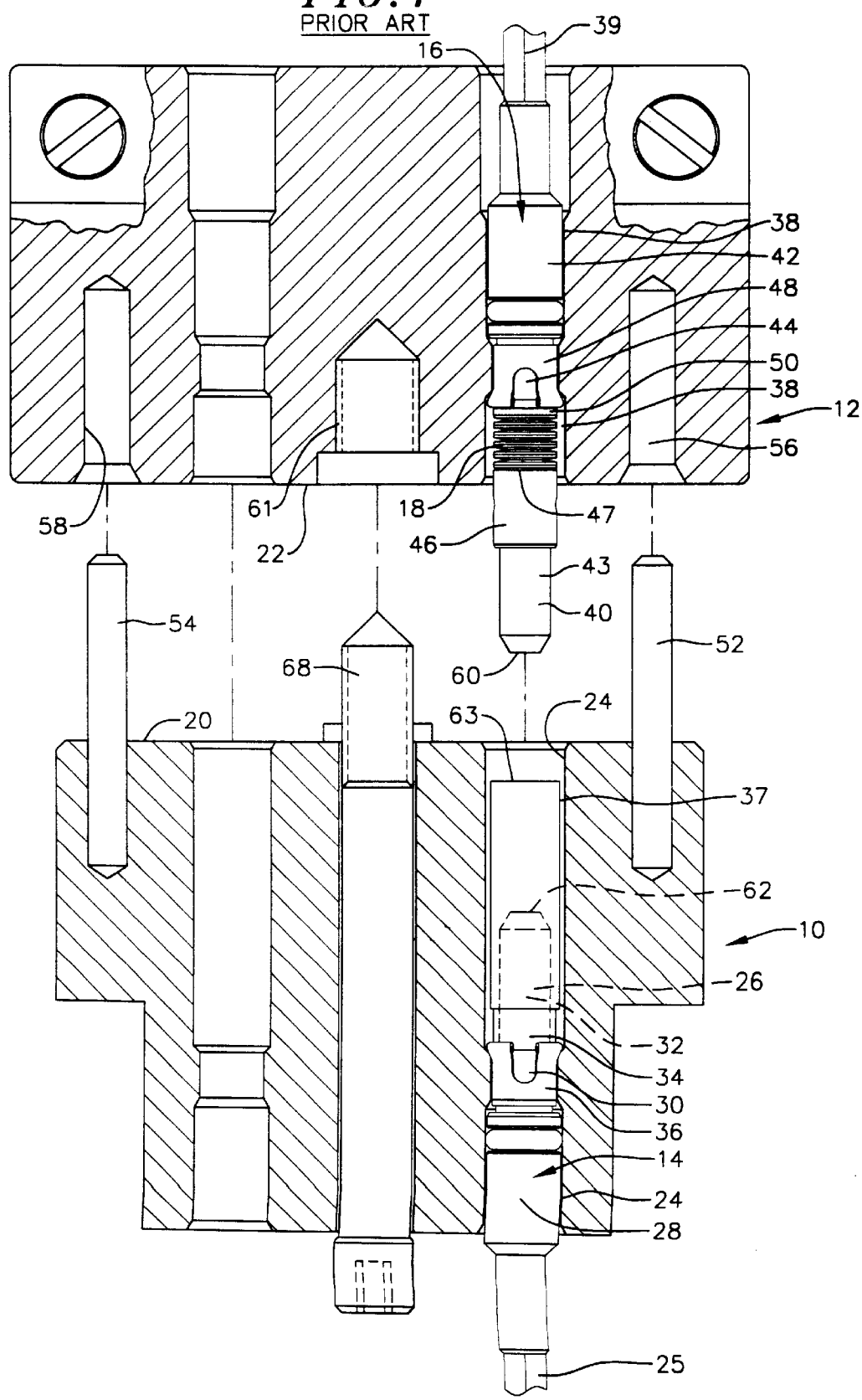
FIG. 1 is a cross-sectional view of two prior art fiber optic connectors with fiber optic termini shown in side view.

Referring now to FIG. 1 the mating of two prior art connectors 10, 12, each having a corresponding terminus 14, 16 one of which (terminus 16) incorporates Belleville washers 18 for applying a spring force is shown. Each connector has a corresponding interface side 20, 22 for interfacing with the other connector. Each connector may be fitted with more than one termini. For illustrative purposes, however, the connectors are described herein as each accommnodating a single terminus.

A first terminus 14 is attached to one end of a fiber optic wire 25 and is fitted within a bore 24 formed in the first connector 10. The first terminus comprises a contact probe 26 and a housing 28. The contact probe 26 proximal end is fitted within the housing 28. The fiber optic wire 25 is coupled to the contact probe 26 through the housing 28 at the proximate end of the first terminus. The fiber optic wire 25 extends coaxially within the probe to the tip 62 of the probe. Distally the probe diameter is stepped up, forming a larger diameter probe section 32 extending from a smaller diameter probe section 30. The first terminus also comprises a sleeve 34 which is fitted over the base of the larger diameter section 32. An expandable sleeve 36 of the first terminus is fitted over and in surrounding relationship to the smaller diameter section 30 and is positioned for receiving the sleeve 34.

The first terminus housing 28 is loosely retained within the bore 24 in first connector 14. The bore 24 accommodating the first terminus is designed to allow for slight side to side movement of the terminus housing 28 relative to the bore without allowing the first terminus to disengage from the bore and thus from the first connector. The connector may be molded around the terminus. An alignment sleeve 37 open at both ends is fitted over the first terminus contact probe 26 within the first connector. The alignment sleeve inner diameter is not as great as the outer diameter of the sleeve 34. Consequently, the sleeve 34 limits the travel of the alignment sleeve relative to the probe.

A second terminus 16 is fitted within a bore 38 in the second connector 12. The second terminus also comprises a contact probe 40 and a housing 42. The proximal end of the contact probe 40 is fitted within the housing 42. A fiber optic wire 39 is coupled to the contact probe 40 through a housing 42 at the proximate end of the second terminus. The fiber optic wire 39 extends coaxially within the probe to the tip 60 of the probe. Distally the probe diameter is stepped up forming a larger diameter probe section 43 extending from a smaller diameter probe section 44. The second terminus also comprises a sleeve 46 which is fitted over the base of the larger diameter section 43. An expandable sleeve 48 is fitted over and in surrounding relationship to the smaller diameter section 44.

A stop washer 50 is fitted over the smaller diameter section 44 of the second terminus probe between the sleeve 46 and the expanding sleeve 48. In prior art termini, a stack of Belleville washers 18 are fitted over the smaller diameter section 44 and are sandwiched between the stop washer 50 and the base 47 of the sleeve 46 at the base of the larger diameter section 43. The stack of Belleville washers define an accordion or bellows-like structure. The distal end including the larger diameter section of the probe 40 of the second terminus extends beyond the interface side 22 of the second connector 12. The second terminus housing 42 is also loosely retained within the bore 38 in the second connector 12.

To guide the alignment and the mating of the two connectors, pins 52, 54 are typically fixedly attached to one connector (the first connector 10, in FIG. 1) and are fitted in corresponding bores 56, 58 formed in the other connector. A fastener 68 extending from one of the connectors (as for example, connector 10 in FIG. 10) may be used to fasten the two connector members together by threading into a threaded bore 61 in the other connector (for example, connector 12 in FIG. 10). Other types of fastening configurations may also be used to keep the two connector members fastened to each other.

Figure 2:
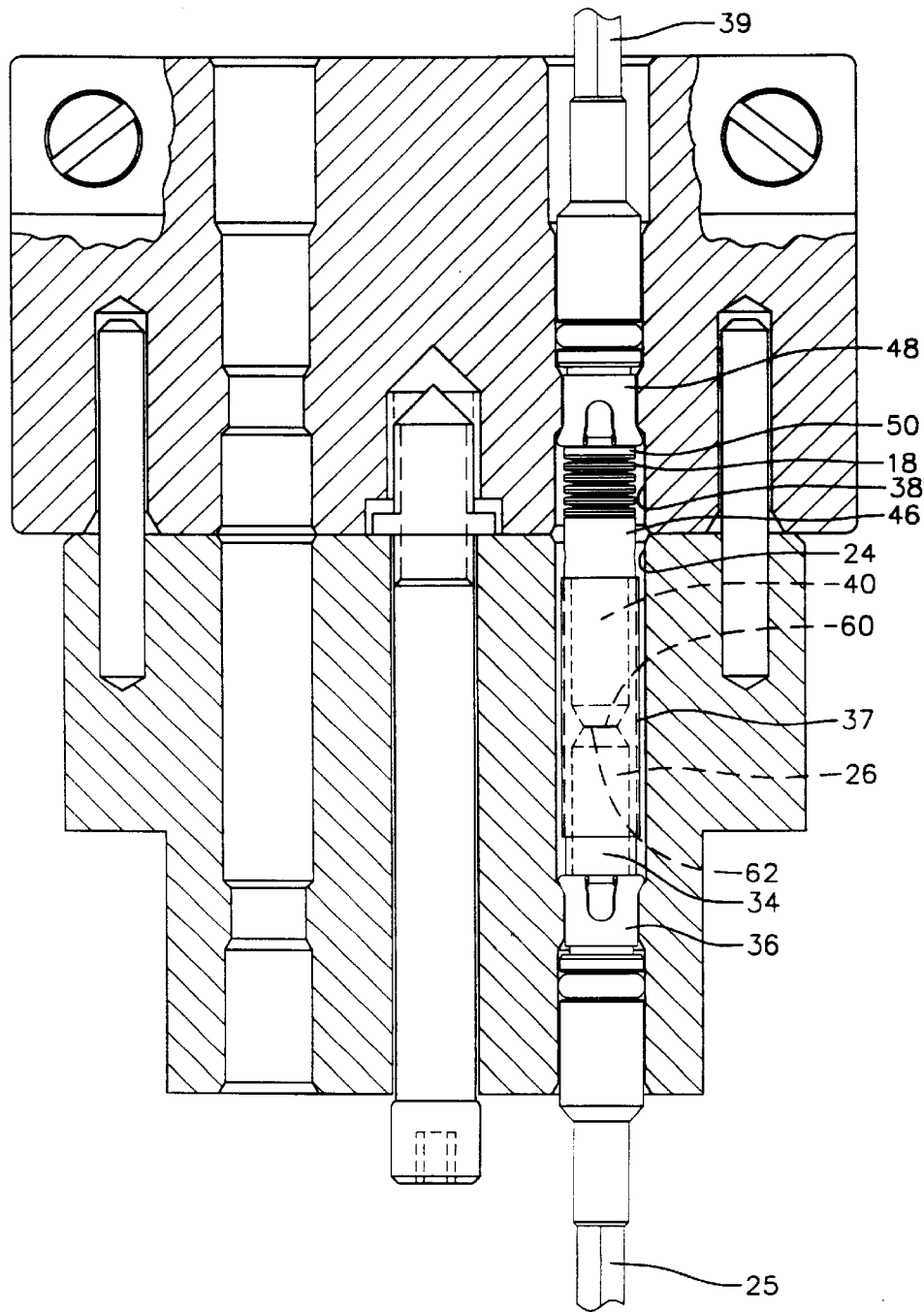
FIG. 2 is a cross-sectional view of the connectors shown in FIG. 1 in a mated position.

When the connector members are fastened together, the second terminus 16 extending from the interface side 22 of the second connector 12 is inserted into the bore 24 in the first connector from the interface side 20 of the first connector and penetrates the alignment sleeve 36 through the open end 63 of the alignment sleeve 37 as shown in FIG. 2. The alignment sleeve ensures that the two contact probes 26, 40 from the two termini are properly aligned so as to properly align the fiber optic wires 25, 39 within the probes. The two contact probes contact each other at their distal tips 60, 62 causing the contact probe 40 of the second terminus to move distally and thereby compress the Belleville washers 18 between the sleeve 46 and the stop washer 50 which engages the second terminus expanding sleeve 48. Consequently, the compressed Belleville washers 18 exert a force against the sleeve 46 forcing the second terminus probe 40 to maintain contact with the first terminus probe 26. Simultaneously, the sleeve 34 of the first terminus engages the expanding sleeve 36 of the first terminus. As a result, a desired distal biasing force is created by the spring action of the Belleville washers when the connector is mated to a corresponding connector and a terminus abuts a corresponding terminus of the mating connector. As the stop washer 50 and the sleeve 34 engage their corresponding expanding sleeves 48 and 36, they cause the expanding sleeves to expand and wedge in their corresponding bores 38 and 24 fixing the position of the termini relative to their corresponding connectors. By allowing the termini to be loosely retained within their corresponding connectors, the alignment sleeve 36 is able to properly align the two probes prior to the locking of the termini in their corresponding connectors.

Figure 3:
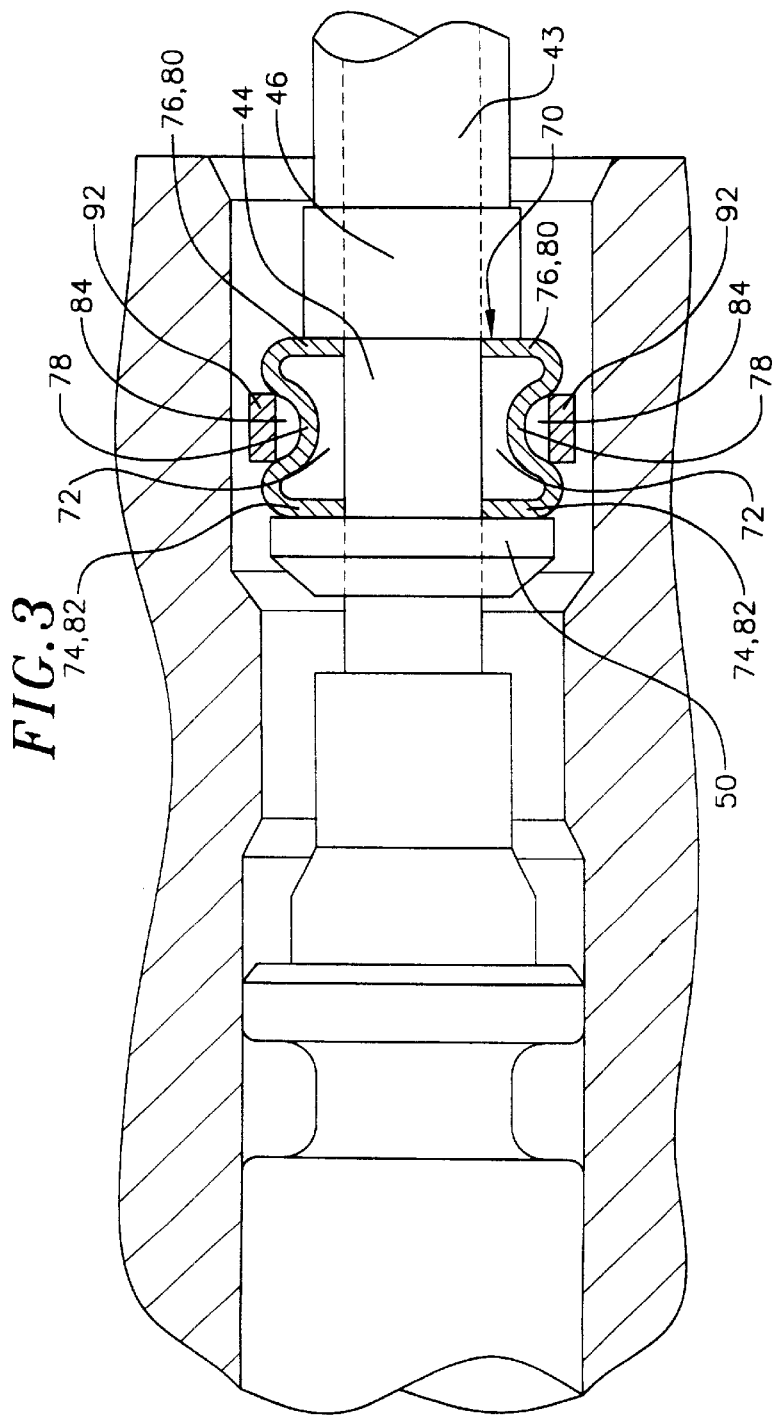
FIG. 3 is partial cross-sectional view of a connector housing a terminus having a spring of the present invention which is shown in cross-section.

Referring now to FIG. 3, in one embodiment, the present invention comprises a unitary construction spring 70 which takes the place of the Belleville 18 washers shown in FIGS. 1 and 2, thereby substantially simplifying the assembly process. The spring 70 is annular in construction, such that it surrounds a portion of the terminus contact probe smaller diameter section 44, much as the Belleville washers shown in FIG. 1 do. The spring defines an annular inwardly extending channel 72 having two legs 74, 76 and a convex web 78 therebetween. Stated differently, the two legs extend radially inward from the web. Each leg defines an annular flange 80, 82. Externally, the convex web defines an annular concavity 84.

As the probe contacts the probe of another terminus during mating of the connectors, one of the flanges 82 engages the stop washer 50 while the other flange 80 engages the sleeve 46 fitted at the base of the larger diameter section 43 of the probe sandwiching the spring. When this occurs the stop washer and the sleeve deform the spring 70 by bending the inwardly extending flanges 80, 82 toward one another. The convex web 78 also allows for some axial compression of the spring. The bent flanges and compressed web provide the necessary spring force as they try to regain their original position for keeping the two probes in proper contact.

Optionally, the spring may be configured to have a split-ring construction such that it is insertable over the terminus probe without having to be slid over the end thereof. In other words, the spring may comprise a longitudinal discontinuity or split 90 formed along the entire length of the spring as shown in FIG. 4 such that it may be opened up so as to allow it to receive the terminus probe through the split thereof If the spring is not split, then it would have to fitted over the terminus during manufacturing of the terminus.

Figure 4:
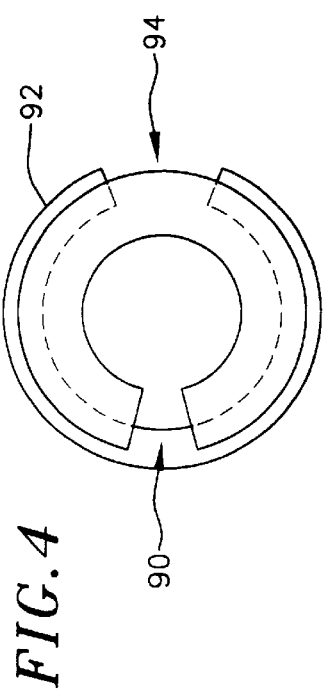
FIG. 4 is an end view of the spring shown in FIG. 3.

An optional retaining ring 92 may be utilized to maintain the spring in position about the terminus as shown in FIGS. 3 and 4 and to prevent the accidental disengagement of the spring from the terminus. The retaining ring 92 should also have a longitudinal split 94 like the split 90 of the spring, such that it may inserted over the spring in the same manner that the spring may be inserted over the terminus probe. The ring is mounted in surrounding relationship to the spring and is fitted within the external concavity 84 formed on the web. In this regard, the ring is axially retained within the concavity. Moreover, the concavity 84 allows for the use of a smaller diameter retaining ring that can be easily accommodated in the connector bore housing the terminus.

Figure 5:
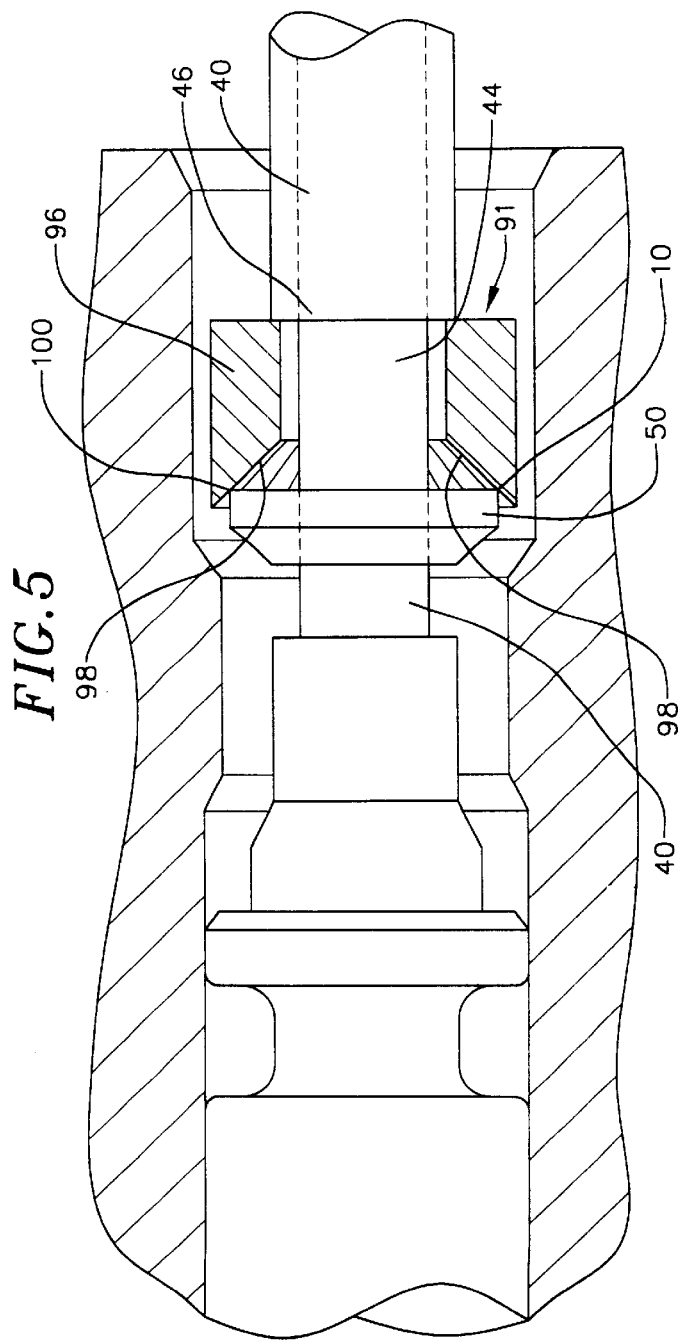
FIG. 5 is partial cross-sectional view of a connector housing a terminus having another embodiment spring of the present invention which is shown in cross-section.
Figure 6:
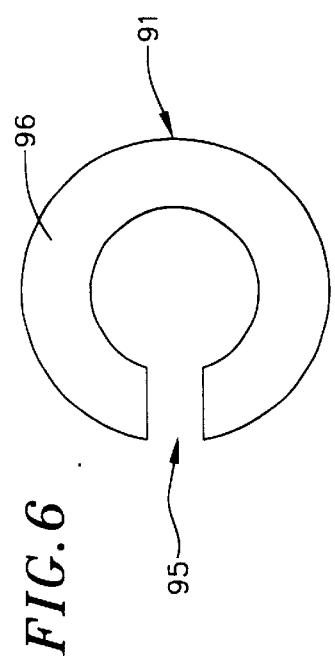
FIG. 6 is an end view of the spring shown in FIG. 5.

A second embodiment spring 91 of the present invention is shown in FIGS. 5 and 6. This second embodiment spring is also of annular construction and comprises a cylindrical body 96 having an edge 98 beveled radially inward and a longitudinal split 95 spanning the length of the spring. The outer surface diameter of the spring 96 is slightly greater than the outer diameter of the stop washer 50. The spring is positioned over the smaller diameter section 44 of the probe with the beveled edge 98 facing the stop washer 50. Because the outer surface diameter of the spring 96 is greater than the outer diameter of the stop washer 50 the beveled edge 98 of the spring engages a circumferential edge 100 of the stop washer. Consequently, the spring expands radially about the split as the beveled edge rides upon the stop washer edge 100 as the probe 40 and thus the spring are moved proximally toward the stop washer when the probe 40 engages the probe of another terminus during mating.

Spring force is created as the radially expanded spring attempts to collapse to regain its original non-expanded configuration. As the spring attempts to collapse, it tends to push itself distally as its beveled edge 98 cams against the stop washer circumferential edge 100.

Figure 7:
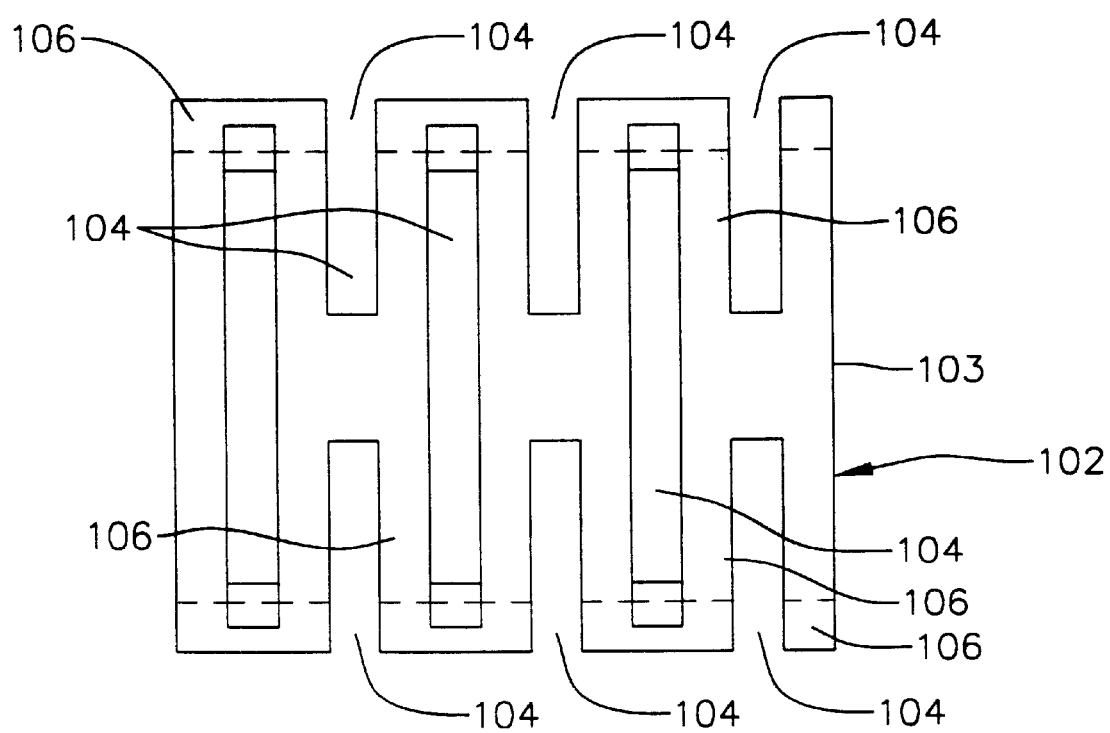
FIG. 7 is a side view of a further embodiment spring of the present invention.

Referring now to FIG. 7, another embodiment spring 102 of the present invention comprises a cylindrical body 103 onto which are formed a plurality of deformable beams which define a plurality of deformable beams 106 which deform so as to provide spring action. This embodiment spring is formed by taking a hollow cylinder and cutting a series of first and second diametrically opposed pairs of cut-outs 104 through the cylindrical surface. The cut-outs are preferably formed by using Electrical Discharge Machining (EDM). The first pairs of cut-outs are oriented at 90° with respect to the second pairs of cut-outs, thus defining the plurality of beams 106 which bend when compressive force is applied to the spring. Each pair of cut-outs are preferably parallel to a plane perpendicular to the longitudinal axis of the cylinder. Moreover, to provide sufficient flexibility to the "beams" each cutout of each pair spans a major portion, preferably greater than 120° of half of the cylindrical body 103 periphery.

Each spring of the present invention may be mounted in a compressed state on its corresponding terminus. In such case, the spring further compresses when the terminus is mated with another terminus.

The springs of the present invention are preferably made from beryllium copper but may be made from other appropriate materials such as spring steel or other resilient metal. Beryllium copper is preferred, however, because it is non-corrosive and easy to heat treat and cut. Preferably, the springs of the present invention are formed by stamping or machining. Cuts are preferably formed by EDM.

The termini and connector features have been described herein by way of example and the present invention is not limited to use with the termini described herein. For example, the springs of the present invention may used with termini whose probe larger diameter section bases are not surrounded by a sleeve and/or may be used with termini which do not incorporate an expanding sleeve and which rely on other structures such as a shoulder formed on the connector for providing a barrier against the proximal movement of the spring.

What is claimed is:

1. A spring for a fiber optic terminus comprising:
   two opposing annular flanges, each flange having a generally planar contacting surface; and
   an annular web between said two annular flanges forming a structure of unitary construction for providing an axial spring force for biasing a fiber optic terminus in an extended position with respect to a connector, wherein the flanges extend laterally relative to the web and are configured to preload an object in a generally perpendicular manner with respect to the planar contacting surface when the annular web is compressed.

2. A spring as recited in claim 1 wherein the flanges extend radially inward from the web.

3. A spring as recited in claim 1 wherein the annular web comprises an internal annular convex surface and a corresponding external annular concave surface.

4. A spring as recited in claim 1 wherein a cut extends across the flanges and web forming a longitudinal split extending along the entire length of the spring.

5. A spring as recited in claim 1 wherein the unitary construction flanges and web are made from beryllium copper.

6. A spring for a fiber optic terminus comprising:
   two opposing annular flanges;
   an annular web between said two annular flanges forming a structure of unitary construction, wherein the flanges extend laterally relative to the web and wherein a cut extends across the flanges and web forming a longitudinal split extending along the entire length of the spring; and
   a retainer ring surrounding the web, the ring having a slit.

7. A spring as recited in claim 6 wherein the annular web comprises an internal annular convex surface and a corresponding external annular concave surface and wherein the retainer ring is positioned at least partially within the concavity of the concave surface.

8. A spring for a fiber optic terminus comprising a cylindrical body comprising a plurality of pairs of opposing cutouts formed through the body wherein each cutout of each pair spans a major portion of half of the body periphery, and wherein adjacent pairs of cutouts are oriented at 90 degrees to each other.

9. A spring as recited in claim 8 wherein each pair of cutouts is parallel to a plane perpendicular to the cylindrical body central axis.

10. A spring as recited in claim 8 formed from beryllium copper.

11. A spring terminus comprising:
    a contact probe comprising a surface;
    a stop member;
    a spring sandwiched between the probe surface and the stop member for biasing the probe, the spring comprising, two opposing annular flanges, and an annular web between said two annular flanges forming a structure of unitary construction, wherein one flange is positioned to engage the stop member and the other flange is positioned to engage the probe surface.

12. A terminus as recited in claim 11 wherein the flanges extend radially inward from the web.

13. A terminus as recited in claim 11 wherein the annular web comprises an internal annular convex surface and a corresponding external annular concave surface.

14. A terminus as recited in claim 11 wherein a cut is formed extending across the flanges and web forming a longitudinal split extending along the entire length of the spring.

15. A terminus as recited in claim 14 further comprising a retainer ring surrounding the web.

16. A spring terminus comprising:

a contact probe comprising a surface;

a stop member having an outer periphery;

a spring sandwiched between the probe surface and the stop member for biasing the probe, the spring comprising, a cylindrical body comprising a plurality of pairs of opposing cutouts formed through the body wherein each cutout of each pair spans a major portion of half of the body periphery, and wherein adjacent pairs of cutouts are oriented at 90 degrees to each other.

17. A terminus as recited in claim 16 wherein each pair of cutouts are parallel to a plane perpendicular to the cylindrical body central axis.

* * * * *